United States Patent [19]

Feldman

[11] Patent Number: 5,190,578

[45] Date of Patent: Mar. 2, 1993

[54] METHOD FOR HYDROMETALLURGICAL PROCESSING OF FRIABLE CONCENTRATION PRODUCTS

[75] Inventor: Alexander V. Feldman, McLean, Va.

[73] Assignee: F & T Technology Corporation, McLean, Va.

[21] Appl. No.: 802,826

[22] Filed: Dec. 6, 1991

[51] Int. Cl.$^5$ ............................................. C22B 11/08
[52] U.S. Cl. ........................................ 75/747; 423/30
[58] Field of Search ............................... 75/747; 423/30

[56] References Cited

U.S. PATENT DOCUMENTS 4,552,589 11/1985 Mason .................................... 423/30

*Primary Examiner*—Peter D. Rosenberg
*Attorney, Agent, or Firm*—Daniel R. Gropper

[57] ABSTRACT

A method for hydrometallurgical processing of friable concentration products containing precious nonferrous and ferrous metals comprising preliminary magnetic separation of friable products to pass ferrous metals into the magnetic product and to produce a nonmagnetic fraction containing nonferrous and precious metals. The nonmagnetic fraction is treated with an alkali solution in the autoclave at 80°–190° C. and an oxygen pressure of 0.1–0.8 MPa, passing aluminium into the solution and obtaining a solid sediment. The sediment is treated with a sulfuric acid solution in the autoclave under a surplus oxygen pressure, passing nonferrous metals into the solution and producing enriched concentrate of precious metals in the solid sediment.

6 Claims, No Drawings

METHOD FOR HYDROMETALLURGICAL PROCESSING OF FRIABLE CONCENTRATION PRODUCTS

FIELD OF ART

The present invention relates to processing recycled resources and, more specifically, to hydrometallurgical processing of friable concentration products containing precious, nonferrous and ferrous metals. The method can be utilized to advantage in processing wastage of electronic equipment, particularly for producing enriched concentrates of precious and nonferrous metals from crushed and mechanically concentrated scrap of electronic instruments.

PRIOR ART

Known in the prior art is a method for hydrometallurgical processing of friable products containing precious, nonferrous and ferrous metals by leaching them in acid medium in which case nonferrous metals such as copper, aluminium, iron, zinc, nickel, lead, tin pass into a solution while precious metals such as gold, silver and platinum are concentrated in a solid sediment which is an enriched concentrate of precious metals (see Japan, Application No. 56-158828 C226 11/04, 7/00 Furukava, Kindzoku, Koge K. K. filed 15.05.80, published 17.12.81).

The acid reagent in the known method is represented by hydrofluoric acid which calls for the use of costly acid-resistant apparatuses and is ecologically dangerous to attending personnel and environment.

The ecologically clean sulfuric acid cannot be used as a reagent in the known method because friable products containing lead, tin and aluminium cannot be treated in sulfuric acid medium since their compounds in this medium precipitate into solid sediment thus blocking the process of acid leaching of copper which is comparatively slow to dissolve into solution, and impairing the quality of the end product.

Known in the prior art is an ecologically clean method for hydrometallurgical processing of friable concentration products of scrap of electronic instruments containing precious and nonferrous metals (see Dunning B. N. "Precious metals recovery from electronic scrap and solder used in electronics manufacture", Inf. Circ. Bur. Mines U.S. Dep. Inter.", 1986, N 9059, p. 44–56). The method involves treating the concentration products with alkali solution (20% solution of sodium hydroxide), passing aluminium into the solution and obtaining a solid sediment which is then treated with a sulfuric acid solution in an autoclave at a surplus oxygen pressure, dissolving nonferrous metals into solution and obtaining enriched concentrate of precious metals in the solid sediment. Said solid sediment is leached by countercurrent under pressure in three stages for stage-by-stage extraction of lead and tin and fuller dissolution of copper.

In the first stage of this method, i.e. in the process of alkalinous treatment preceding acidic leaching it becomes possible to dissolve almost all aluminium from the source material, said aluminium precipitating into sediment in the acidic medium. Besides, acidic leaching in the autoclave under oxygen pressure has made it possible to intensify somewhat the dissolution of tin and lead and to facilitate the dissolution of copper. However, to improve dissolving of copper, the acidic leaching process in the known method is conducted in three stages which increases the duration of the process and, consequently, reduces its efficiency.

Besides, the known method is noted for a comparatively low extraction of silver (82%) into enriched concentrate.

DISCLOSURE OF THE INVENTION

It is an object of the invention to improve the degree of recovery of precious metals.

Still another object is to reduce the number of operations.

A further object is improved efficiency.

And a still further object is wastefree production.

The essence of the invention resides in providing a method of hydrometallurgical processing of friable concentration products containing nonferrous and precious metals involving treatment of said products with an alkali solution, dissolving aluminium into solution and obtaining solid sediment, subsequent treatment of said sediment with a sulfuric acid solution in an autoclave under surplus oxygen pressure, passing nonferrous metals into a solution and producing enriched concentrate of precious metals in the solid sediment wherein, according to the invention, the products are treated with an alkali solution in an autoclave supplied with surplus oxygen at 80°–190° C. under a pressure of 0.01–0.8 MPa.

Should the friable products contain additionally ferrous metals, it is practicable before treatment with alkaline solution that the friable products be subjected to magnetic separation, dissolving ferrous metals into a magnetic product and obtaining a nonmagnetic fraction containing nonferrous and precious metals which are then delivered for treatment with an alkali solution.

For further increase of efficiency, it is desirable that processing in an alkali solution should be conducted by maintaining a ratio of solid and liquid phases in the autoclave within 1:15–1.

For wastefree production it is practicable that the solution after alkalinous treatment be mixed with the solution after sulfuric acid treatment in the ratios ensuring production of a neutral solution of alkalinous metal sulfate and the concentrate of nonferrous metals as the end product.

The method for hydrometallurgical processing of friable concentration products containing precious, nonferrous and ferrous metals according to the invention provides for higher degree of recovery of precious metals at the same time curtailing the number of operations by carrying out sulfuric acid leaching in one step, increasing substantially the efficiency of the process by elimination of the masking effect of iron and lead, improving dissolving kinetics of other nonferrous metals, in the first place copper, also zinc and tin and preventing dissolution of precious metals.

The method according to the invention permits setting up wastefree production, i.e. producing concentrate of nonferrous metals by mixing solutions after alkalinous treatment of the feed and after sulfuric acid leaching.

Now the invention will be explained by a detailed description of the embodiments of the method for hydrometallurgical processing of friable concentration products according to the invention.

BEST MODES OF CARRYING OUT THE INVENTION

The friable products of concentration are constituted by a rough concentrate containing precious, nonferrous and ferrous metals (or precious and nonferrous metals alone) produced by mechanical concentration of crushed scrap of electronic instruments.

The chemical composition of scrapped electronic instruments is extremely complicated. The main metallic component is copper coated with aluminium, tin, lead. The scrap of electronic instruments also contains silver, gold and ferrous metals, iron for one.

In the case when friable products of concentration contain only precious and nonferrous metals, theys are first treated with an alkali solution, for example a 20% solution of sodium hydroxide in an autoclave supplied with surplus oxygen at 80°–190° C. and an oxygen pressure of 0.1–0.8 MPa. This stage of the process is conducted until lead, aluminium and part of tin are dissolved.

Lead is quantitatively insoluble in solutions of sodium hydroxide but in presence of an oxidant the process of dissolution is considerably intensified. Dissolution of lead is also accelerated at temperatures above 80° C. The temperature which is advantageous to autoclave leaching in the solution of sodium hydroxide ranges from 80°–190°.

At temperatures below 80° C. the lead dissolution rate drops sharply which increases the amount of cake and reduces output. Cake must be enriched in silver which leads to losses of the latter.

A rise of temperature within the limits of the above-stated interval speeds up the dissolution rate of lead and aluminium.

A rise of temperature above 190° C. reduces solubility of aluminium and lead compounds in sodium hydroxide which reduces extraction of these metals into solution and fails to provide a positive effect.

While dissolving lead and aluminium in the autoclave, the partial pressure of oxygen should be maintained within 0.1 and 0.8 MPa.

If oxygen pressure drops below 0.1 MPa, dissolution of lead is discontinued which increases the yield of cake. The required output is not reached.

Increase of pressure above 0.8 MPa may cause oxidation which brings about dissolving of silver into the solution, calls for additional operations of its extraction and thus the positive effect is also unattainable.

The solid sediment obtained after treatment with an alkali solution is forwarded to the second treatment stage, i.e. sulfuric acid leaching.

The sediment is processed in a 20% solution of sulfuric acid in the autoclave under surplus pressure of oxygen. In this stage copper, zinc, tin and other nonferrous metals are dissolved and solid sediment i.e. enriched concentrate of precious metals, is formed. Full extraction of copper into the solution takes place within one step because copper in the stage of autoclave treatment with alkali under the conditions selected according to the present invention changes partly to oxide form which facilitates its dissolution in the second stage of treatment. Besides, lead, aluminium and, partly, tin which block dissolution of copper in acidic medium have already been recovered in the first stage of treatment.

The precious metals (gold and silver) are concentrated only in the solid sediment of sulfuric acid leaching in the autoclave.

This increases the degree of recovery of precious metals into cake of autoclave sulfuric acid leaching up to 97%.

The alkaline solution with dissolved nonferrous metals produced in the first stage of leaching is mixed with the acid solution also containing nonferrous metals passed into it in the second leaching stage in proportions which ensure the production of a neutral (pH=4–8) solution of sulfate of alkali metal (sodium) and concentrate of nonferrous metals in solid sediment.

In the case when in addition to precious and nonferrous metals friable products contain also ferrous metals, for example, iron, the friable products are subjected to magnetic separation before their treatment with alkali solution so that ferrous metals are dissolved into magnetic product, producing nonmagnetic fraction containing nonferrous and precious metals. Said fraction is directed for treatment in alkali solution as has been described above.

It is commonly known that at the copper dissolving stage iron, like lead, forms a series of insoluble salts (hydroxosulfates), completely masking the dissolving surface which brings about diffusion difficulties in dissolution of copper and other metals. Extraction of iron and lead in the stages preceding autoclave sulfuric acid leaching provides for an optimum kinetic mode of dissolution of copper and other nonferrous metals. Magnetic separation of feed (concentration products of electronic instruments) ensures separation of iron into magnetic product. Employment of magnetic separation for removal of iron makes the surface of nonmagnetic product more active which provides for a high dissolution rate of nonferrous metals in the subsequent stages.

A vital importance for autoclave leaching of feed in the solution of sodium hydroxide is attached to density of pulp.

When the ratio of liquid-to-solid phases is below 1:1 this may bring about precipitation of compounds of the metals being dissolved which results in lower efficiency of the process and in losses of precious metals.

When this ratio is increased over 15 the volume of solutions is also increased and concentration of nonferrous metals therein diminishes. Processing of these solutions for producing concentrate of nonferrous metals becomes inexpedient and the positive effect is not attained. Besides, losses of precious metals with flow of solutions are also possible.

To elucidate further the essence of the present method, given below are concrete examples of its realization.

EXAMPLE 1

A 100-g portion of friable concentration products taken after magnetic separation, containing nonferrous and precious metals (referred to hereinafter as feed) had the following composition, mass % copper, 45; nickel, 5.6; zinc, 3.4; silver, 2.07; gold, 0.1; aluminium, 12; lead, 4.7; tin, 17; iron, 0.2; ceramics, the balance. The feed was leached by autoclaving in the solution of sodium hydroxide at 135° C. and at an oxygen pressure of 0.45 MPa. The ratio of solid-to-liquid phases was 1:8. The process produced cake and a solution containing aluminium, lead and tin. There were no traces of silver in the solution. The produced cake was directed for autoclave leaching in a sulfuric acid solution which produced cake (concentrate of precious metals) and a solution containing copper, tin and zinc. As a result, 84% of silver passed into cake. The obtained concentrate had the following composition, mass %: copper 43.2; nickel, 0.8; zinc, 0.2; silver, 8.1; gold, 0.46; aluminium, 0.5; lead, 0.3; tin, 0.3; ceramics, the balance.

The solutions produced by autoclaving were mixed, obtaining sediment at pH=7.1 containing a concentrate of nonferrous metals. Composition of concentrate, mass %: compounds of copper, 63.41; nickel, 0.56; zinc, 2.25; aluminium, 19.7; lead, 8.45; tin, 5.63. This concentrate can be directly used in copper production. 97% of filtrate was represented by sodium sulphate.

Examples 2 through 14 were carried out similarly to Example 1 with the sole difference in that the stage of processing the feed with sodium hydroxide was accompanied by changes in the temperature, pressure of oxygen delivered into the autoclave and liquid-to-solid phase ratio within the limits according to the invention and somewhat higher.

EXAMPLE 15

A 100-g portion of friable concentration products containing nonferrous and precious metals (referred to hereinafter as feed) had the following composition, mass %: copper, 43; nickel, 4.6; iron, 8.9; zinc, 2.4; silver, 1.23; gold, 0.1; aluminium, 12; lead, 5.6; tin, 16.3; ceramics, the balance. The feed was subjected to magnetic separation which produced magnetic and nonmagnetic products. The nonmagnetic product was subjected to autoclave leaching in a solution of sodium hydroxide at a temperature of 135° C., an oxygen pressure of 0.45 MPa and a liquid-to-solid phase ratio of 1:8. After processing, the material was separated into cake and a solution containing aluminium, lead, tin. Silver was not observed in the solution.

The produced cake was taken for autoclave leaching in a sulfuric acid solution. As a result, obtained was cake (concentrate of precious metals) and a solution containing copper, tin, zinc. 84% of silver passed into the solution. The produced concentrate has the following composition, mass %: copper, 43; nickel, 0.8; zinc, 0.2; silver, 8.1; gold, 0.77; aluminium, 0.5; lead, 0.3; tin, 0.3; ceramics, the balance.

The solutions produced after autoclaving were mixed and the sediment at pH=7.2 represented concentrate of nonferrous metals. Composition of said concentrate, mass %, was as follows: compounds of copper, 63.41; nickel, 0.56; zinc, 2.25; aluminium, 19.7; lead, 8.45; tin, 5.63. This concentrate can be directly used in copper production. 98% of filtrate was represented by sodium sulphate.

The variable parameters and results of examples 1-15 are summarized in a table below.

TABLE

| No. | Parameters | | Solid-to-liquid phase ratio | Recovery into concentrate % | |
|---|---|---|---|---|---|
| | T, °C. | P MPa | | | |
| 1 | 2 | 3 | 4 | 5 | 6 |
| 1 | 135 | 0.45 | 1:8 | 84 | 99 |
| 2 | 80 | 0.45 | 1:8 | 84 | 99 |
| 3 | 190 | 0.45 | 1:8 | 83 | 99 |
| 4 | 135 | 0.1 | 1:8 | 84 | 99 |
| 5 | 135 | 0.8 | 1:8 | 83 | 99 |
| 6 | 135 | 0.45 | 1:15 | 83 | 99 |
| 7 | 135 | 0.45 | 1 | 83 | 99 |
| 8 | 70 | 0.45 | 1:8 | process discontinued | |

TABLE-continued

| No. | Parameters | | Solid-to-liquid phase ratio | Recovery into concentrate % | |
|---|---|---|---|---|---|
| | T, °C. | P MPa | | | |
| 1 | 2 | 3 | 4 | 5 | 6 |
| 9 | 200 | 0.45 | 1:8 | 81 | 98 |
| 10 | 135 | 0.05 | 1:8 | process discontinued | |
| 11 | 135 | 0.9 | 1:8 | 83 | 99 |
| 12 | 135 | 0.45 | 1:16 | 84 | 99 |
| 13 | 135 | 0.45 | 2 | process discontinued | |
| 14 | 80 | — | — | process discontinued | |
| 15 | 135 | 0.45 | 1:8 | 84 | 99 |

These data are an evidence of complex extraction of feed components and recovery of two end products: concentrate of precious metals and concentrate of nonferrous metals, and higher recovery of precious metals into concentrate, namely up to 84% silver and up to 99% gold.

I claim:

1. A method for hydrometallurgical processing of friable secondary metallic products containing nonferrous and precious metals and comprising the following operations:
   a. Treatment of said products with an alkali solution in the autoclave at 80°-190° C. and delivery of oxygen into said autoclave at a pressure of 0.1-0.8 MPa as a result of which aluminum and lead pass from said products into said alkali solution while other said products form a solid sediment; and,
   b. Treatment of said solid sediment with a sulfuric acid solution in another autoclave under surplus oxygen pressure as a result of which said nonferrous metals pass from said solid sediment into said solution of sulfuric acid and form enriched concentrate of precious metals in the form of another solid sediment.

2. A method for hydrometallurgical processing of friable secondary metallic products containing nonferrous, precious and ferrous metals comprising the following operations:
   a. Magnetic separation in which said ferrous metals pass into a magnetic product and produce a nonmagnetic fraction containing nonferrous and precious metals;
   b. Treatment of said non-magnetic fraction with alkali solution in an autoclave at 80°-190° C. and feeding oxygen into said autoclave under a pressure of 0.1-0.8 MPa so that aluminum and lead pass from said nonmagnetic fraction into said alkali solution while the remaining components of said nonmagnetic fraction form a solid sediment;
   c. Treatment of said solid sediment with a sulfuric acid solution in another autoclave at a surplus pressure of oxygen so that said nonferrous metals pass from said solid sediment into said sulfuric acid solution and the produced enriched concentrate of precious metals has the form of a solid sediment.

3. A method for hydrometallurgical processing according to claim 1 wherein said treatment in said alkali solution is carried out at a solid-to-liquid phase ratio of said solution being equal to 1:15-1.

4. A method for hydrometallurgical processing according to claim 2 wherein said treatment in said alkali solution is carried out at a solid-to-liquid phase ratio of said solution being equal to 1:15-1.

5. A method for hydrometallurgical processing according to claim 1 wherein said alkali solution after dissolution therein of said aluminium and lead is mixed with said sulfuric acid solution after said dissolution in it of said nonferrous metals in proportions which provide for producing a neutral solution of sulfate of the alkali metal and a concentrate of said nonferrous metals.

6. A method for hydrometallurgical processing according to claim 2 wherein said alkali solution after dissolution therein of said aluminium and lead is mixed with said sulfuric acid solution after said dissolution in it of said nonferrous metals in proportions which provide for producing a neutral solution of sulfate of the alkali metal and a concentrate of said nonferrous metals.

* * * * *

UNITED STATES PATENT AND TRADEMARK OFFICE
CERTIFICATE OF CORRECTION

PATENT NO. : 5,190,578

DATED : Mar. 2, 1993

INVENTOR(S) : Alexander V. Feldman

It is certified that error appears in the above-identified patent and that said Letters Patent is hereby corrected as shown below:

On the title page, in item [22], "Dec. 6, 1991" should be --Dec. 9, 1991--.

Signed and Sealed this

Third Day of August, 1993

Attest:

MICHAEL K. KIRK

Attesting Officer     Acting Commissioner of Patents and Trademarks